United States Patent [19]

Hoskins et al.

[11] Patent Number: 4,538,679
[45] Date of Patent: Sep. 3, 1985

[54] FLUID COUPLING ASSEMBLY

[75] Inventors: John T. Hoskins, 16 Cobblestone Ct., Orchard Park, N.Y. 14127; Robert G. Zillig, 4401 Overlook Dr., Williamsville, N.Y. 14221; Steven R. Zillig, Williamsville, N.Y.

[73] Assignees: John T. Hoskins, Orchard Park; Robert G. Zillig, Williamsville, both of N.Y.

[21] Appl. No.: 673,043

[22] Filed: Nov. 19, 1984

[51] Int. Cl.³ .............................................. F28F 9/04
[52] U.S. Cl. ................................. 165/178; 165/140; 285/319; 285/321
[58] Field of Search .................... 165/140, 178; 285/3, 285/4, 158, 220, 277, 305, 316, 319, 321, DIG. 2, DIG. 22

[56] References Cited
U.S. PATENT DOCUMENTS

| 2,318,965 | 5/1943 | Parker et al. | 285/277 X |
| 3,305,248 | 2/1967 | Margis | 285/4 |
| 3,826,523 | 7/1974 | Eschbaugh | 285/319 X |
| 3,922,011 | 11/1975 | Walters | 285/277 |
| 4,227,570 | 10/1980 | Crews | 165/140 X |

Primary Examiner—Stephen F. Husar
Attorney, Agent, or Firm—Christel, Bean & Linihan

[57] ABSTRACT

A fluid coupling assembly which is capable of interconnecting an oil cooler 26 disposed within a radiator header with an oil line 200 or 300 terminating outside of said header. The coupling includes a tubular fitting 204 or 304 which has a first portion brazed about a port 32 in the oil cooler and a second portion which is adapted to be secured to a header wall 37 or 70. The tubular fitting is provided with a bore and the tubular connector end portion 202 or 302 of the oil line is adapted to be telescoped within the bore to an assembled position. A seal 206 or 306 is mounted within the bore. Coupler means 208 or 308 are provided for holding the tubular fitting and the tubular connector end portion in their assembled position, the coupler means including a radially outwardly extending surface 246 or 346 on the tubular connector end portion and a spring wire clip 248 or 348 received within a groove 242 or 342 on the tubular fitting.

18 Claims, 10 Drawing Figures

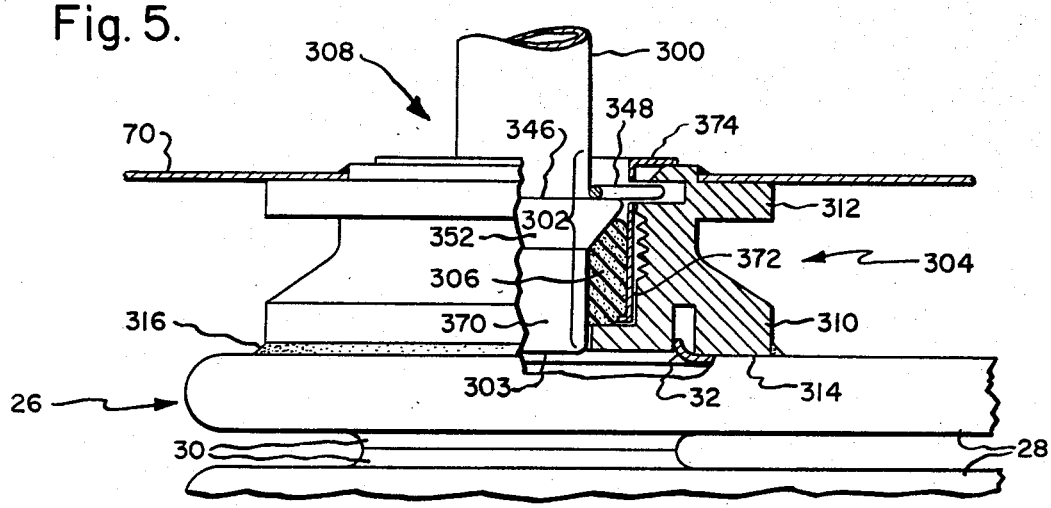
Fig. 5.
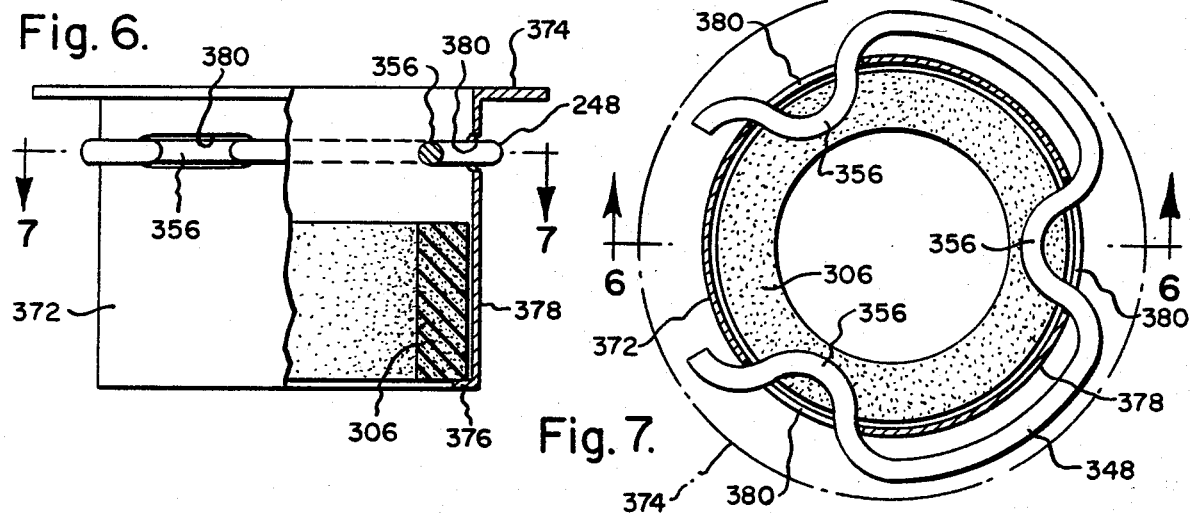
Fig. 6.
Fig. 7.
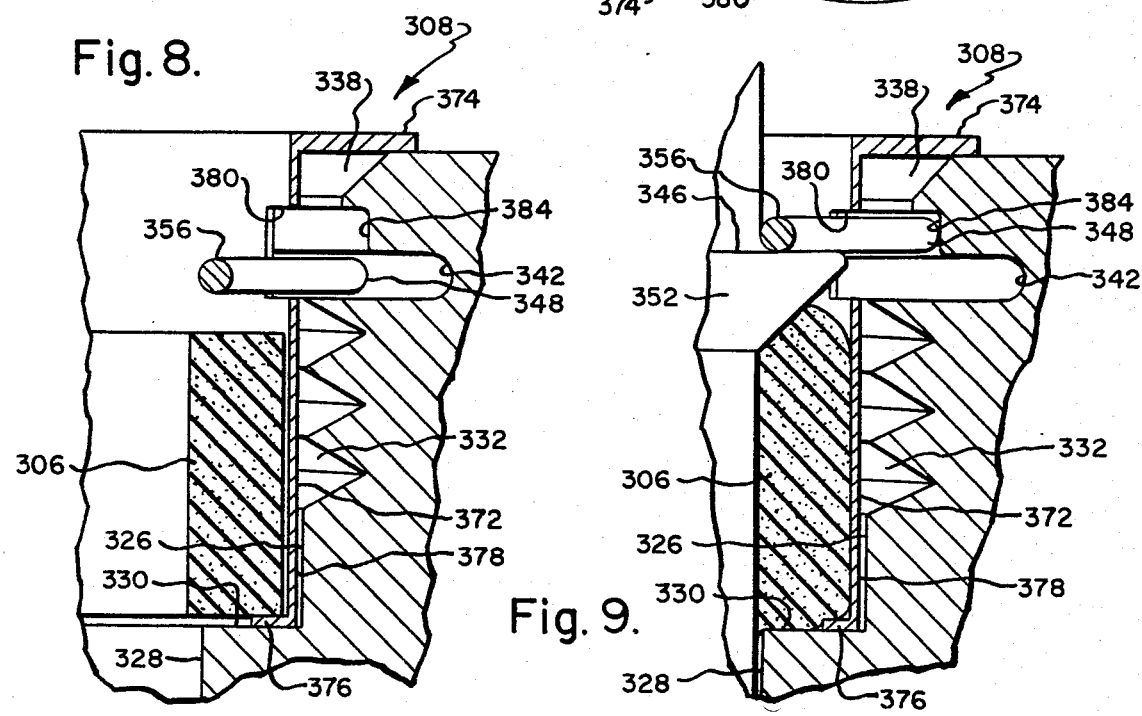
Fig. 8.
Fig. 9.

FLUID COUPLING ASSEMBLY

CROSS REFERENCE TO RELATED APPLICATIONS

This application discloses a fluid coupling of the same general type as disclosed in U.S. patent application Ser. No. 558,501 filed Dec. 6, 1983.

FIELD OF THE INVENTION

The present invention relates to a fluid coupling assembly for connecting an oil cooler disposed within the header of an automobile radiator to the tubular connector end portion of an oil line. This invention finds utility in the automotive industry where a transmission oil cooler is frequently disposed within the header of a radiator for a water cooled engine.

BACKGROUND

A typical automobile radiator consists of spaced apart inlet and outlet headers which are interconnected by a plurality of tubes which extend through a number of parallel fins over which ambient air is drawn by a fan (or by the forward movement of the automobile), the air serving to cool the engine coolant. If the automobile is provided with an automatic transmission, it may be necessary to provide a heat exchanger for cooling the transmission oil or fluid. An oil cooler may be provided over which air may pass in one form of transmission oil cooler. In another form, which is more typical of many automobiles, the transmission oil cooler is actually disposed within one of the headers of the automobile radiator, and therefore the transmission oil is cooled by the engine coolant as it passes over this heat exchanger. To this end, a radiator which utilizes this form of transmission oil cooler is provided with a header having a pair of spaced apart aperatures. The associated oil cooler is provided with fittings which extend through the apertures and to which oil lines may be secured directly.

In practice, a number of disadvantages have been found with this prior art construction. One disadvantage relates to the use of seal plugs. Thus, after the assembly of the fitting to the oil cooler, it is necessary to seal the oil cooler to prevent the introduction of foreign elements into the cooler. This is done by screwing threaded plugs into the oil cooler fittings. At the final assembly location, which may be many hundreds of miles away from the location where the oil cooler and radiator are fabricated, it is then necessary to remove these plugs. It has been found in practice that it is frequently difficult to remove these plugs, which disassembly may take place many months after the plugs were installed. The labor costs associated with the removal of these seal plugs, and the subsequent waste of these plugs, is considered to be excessive. Another disadvantage of the prior art construction relates to the labor costs associated with the time involved in assembling the oil line to the fitting and the subsequent testing which is required.

A further disadvantage relates to the subsequent servicing of the vehicle. Once the transmission oil line has been secured to the existing fitting of the prior art, it has been found that during servicing of an automobile it is frequently necessary to cut the oil line in order to remove the radiator, as servicemen are reluctant to disconnect the end of the oil line from the radiator in view of a variety of problems.

Also, it has been noted that the existing fittings of the prior art, which are made of a ferrous material, will frequently corrode and up to one half of the antirust ingredient of the initial coolant fill may be utilized in overcoming the rust attributible to the transmission oil line fittings.

OBJECTS AND SUMMARY OF THE PRESENT INVENTION

It is an object of the present invention to provide a novel fluid coupling assembly which will overcome the disadvantages of the prior art. More specifically, it is an object of the present invention to provide a fluid coupling assembly which will permit the interconnection of oil lines to an oil cooler disposed within a radiator header with a minimum of labor time.

Another object of the present invention is to provide a novel fluid coupling assembly which does not require the utilization of threaded seal plugs which are used to prevent the introduction of foreign elements into the cooler prior to final assembly, which plugs must subsequently be disassembled from the cooler at the point of final assembly of the radiator into an automobile.

A still further object of the present invention is to provide a fluid coupling assembly which will facilitate disconnection of the ends of the oil line from the radiator to facilitate servicing of the radiator after final assembly.

Another object of the present invention is to provide a novel fluid coupling assembly of high reliability and relatively low cost.

The above objects and other objects and advantages of the present invention are accomplished by providing a novel fluid coupling assembly having a tubular fitting provided with a stepped bore, a first portion of the tubular fitting being brazed to the oil cooler and another portion extending through an aperture in the header wall and being secured to the header wall in a fluid tight relationship about said aperture. The assembly further includes a tubular cylindrical elastomeric seal disposed within the bore with one end being adjacent said step. The coupling assembly also includes coupler means including a radially outwardly extending surface on the tubular connector end portion of an oil line and a catch on the tubular fitting, the catch being a generally C-shaped spring wire clip which is adapted to engage the radially outwardly extending surface to hold the tubular connector end portion telescoped within a portion of the tubular fitting.

The preceding objects and other objects and advantages of this invention will become more apparent after a consideration of the following detailed description taken in conjunction with the accompanying drawings in which two preferred forms of this invention are illustrated.

BRIEF DESCRIPTION OF THE DRAWINGS

FIG. 5 is a view similar to FIG. 3 but illustrating a second embodiment of a fluid coupling assembly which is suitable for use with the radiator header having a metallic wall.

FIG. 6 is a view illustrating a sub-assembly of the fluid coupling shown in FIG. 5.

FIG. 7 is a sectional view taken generally along the line 7—7 in FIG. 6.

FIGS. 8 and 9 are enlarged cross sectional views illustrating a portion of a modified version of the second embodiment shown in FIG. 5, FIG. 8 showing various parts prior to final assembly, and FIG. 9 showing various parts after final assembly.

DETAILED DESCRIPTION

Figure 1:
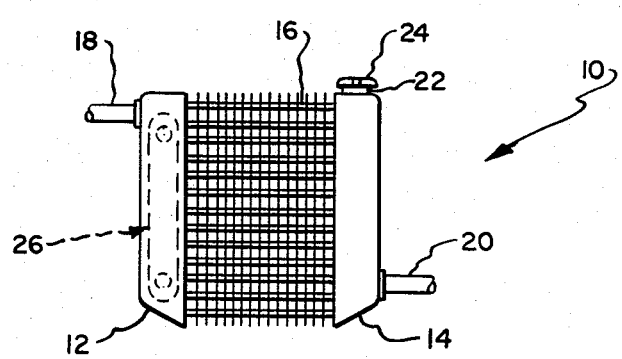
FIG. 1 is a rear view of an automotive radiator in which the principles of this invention may be embodied.

Referring first to FIG. 1, an automotive radiator is illustrated, this radiator being suitable for use with the present invention. The automotive radiator, which is indicated generally at 10, includes spaced apart left and right hand headers 12,14, respectively. The heat exchanger element 16 of the radiator 10 extends between the headers 12 and 14 and consists of a plurality of parallel tubes and transverse fins, which fins are parallel to the headers 12 and 14. The headers are provided with cylindrical extensions to which radiator hoses 18 and 20 may be secured in a conventional manner. The radiator is also provided with a fill port 22 which is closed by a radiator cap 24. While a transverse flow radiator has been illustrated, it should be appreciated that many radiators have vertically spaced apart headers interconnected by vertically extending tubes and that the present invention is also suitable for use with such radiators as well as the radiators of the form shown in FIG. 1. As illustrated in FIG. 1, one of the headers may be provided with an oil cooler for cooling transmission oil, the oil cooler being indicated generally at 26. In FIG. 1 only one oil cooler 26 is illustrated, this oil cooler customarily being utilized for cooling transmission oil. However, it should be appreciated that the oil cooler 26 could be utilized for cooling other fluids, such as for example, engine oil for a deisel engine. In addition, it should also be appreciated that the radiator may be provided with more than one oil cooler, and thus an oil cooler 26 may be provided in each header. Each header which is to receive an oil cooler is provided with a pair of spaced apart apertures in one of its walls.

Figure 2:
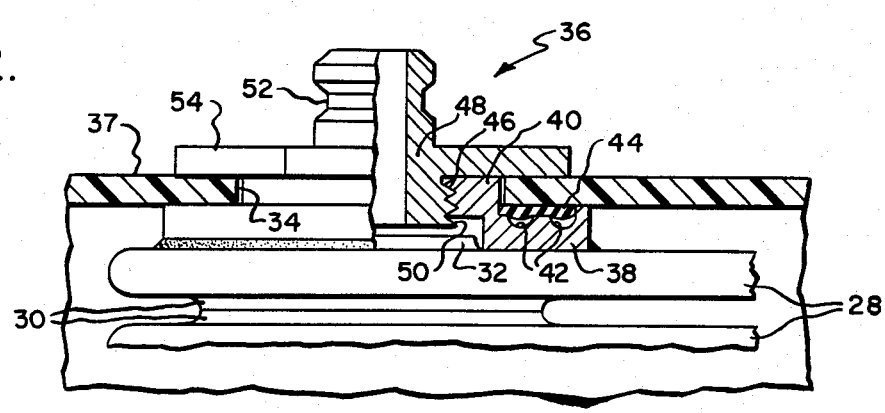
FIG. 2 is an enlarged cross sectional view of a portion of a radiator header in which an oil cooler is installed, this view also illustrating a portion of a prior fluid coupling assembly.

One end of a prior art oil cooler is illustrated in greater detail in FIG. 2. It can be seen that the prior art oil cooler consists of a plurality of spaced apart plate like elements 28 which are interconnected at opposed ends by fluid passageway forming elements 30. As shown in FIG. 2, a locating flange 32 is disposed about a port in the top wall of the top plate 28.

With further reference to FIG. 2 a portion of a prior fluid coupling assembly is illustrated. In this regard, it should be noted that the oil cooler 26 is provided with two sets of aligned passageway forming elements 30, and two locating flanges 32, which are concentric with associated fluid passageway forming elements 30. Substantially identical couplings are associated with each of the locating flanges 32, each coupling extending through associated apertures 34 in a header wall. One of the couplings or tubular fittings, which are indicated generally at 36, is utilized for inlet oil, and the other one for outlet oil. As the couplings are identical for inlet and outlet, only one has been illustrated.

The design illustrated in FIG. 2 is suitable for use with headers of the type formed from a plastic material. In this form of design it is necessary that the coupling be clamped about the surfaces of the header wall 37 in a fluid tight manner about an associated aperture 34.

The prior coupling is formed of two portions. The first portion 38 is brazed in a fluid tight relationship to the top oil cooler plate 28 about the port defined by the locating flange 32. The top of the first portion is provided with a neck portion 40 which extends into the aperture 34. Part of the first portion extends radially outwardly of the neck portion and is provided with grooves 42 is its top surface, the grooves 42 in turn cooperating with a compressible washer 44 to form a seal about the aperture 34. The bore within the neck portion is provided with threads 46.

The second portion 48 of the tubular fitting is adapted to be screwed into the first portion and to clamp the apertured wall 37 of the header between the first and second portions, thereby compressing the compressible washer 44 to insure a fluid tight seal. Thus, the second portion has a threaded lower end 50. The upper end of the second portion is provided with a groove 52 to which a quick disconnect coupler may be secured. Between the upper portion and the lower portion is a flanged portion 54 which may be provided with suitable flats to facilitate the assembly of the second portion onto the first portion, the flanged portion 54 bearing against the top surface of the header wall 37 when the first and second portions 38,48 are assembled to each other.

While the design just described has advantages over earlier prior art constructions, it does require that a quick coupler be mounted on one end of an oil line for securement to the tubular fitting. Quick couplers suitable for use with the fitting of the type illustrated in FIG. 2 are traditionally provided with telescoping parts which are spring biased to a normal position and a plurality of balls which are capable of engaging the groove, the quick coupler also being provided with a seal which provides a fluid tight connection between the fitting and the quick coupler. While this form of design performs in a very satisfactory manner, it is desirable that a design be provided which is somewhat less costly.

DETAILED DESCRIPTION OF FIGS. 3 AND 4

Figure 4A:
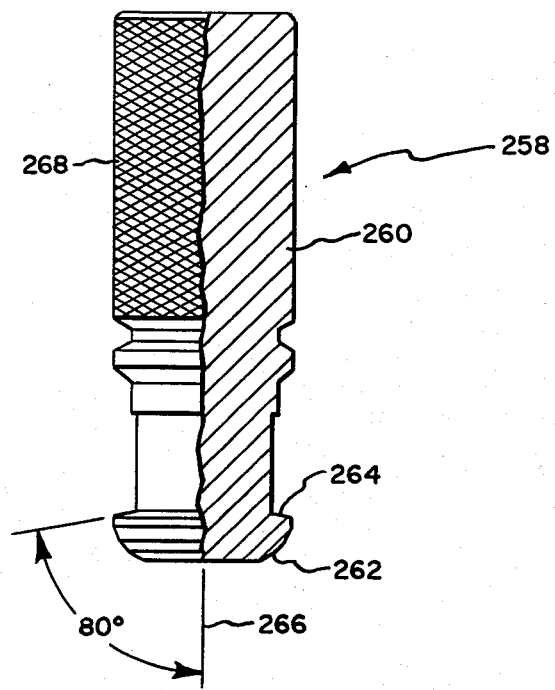
FIG. 4A illustrates a seal plug which may be utilized with the embodiment of FIGS. 3 and 4.
Figure 3:
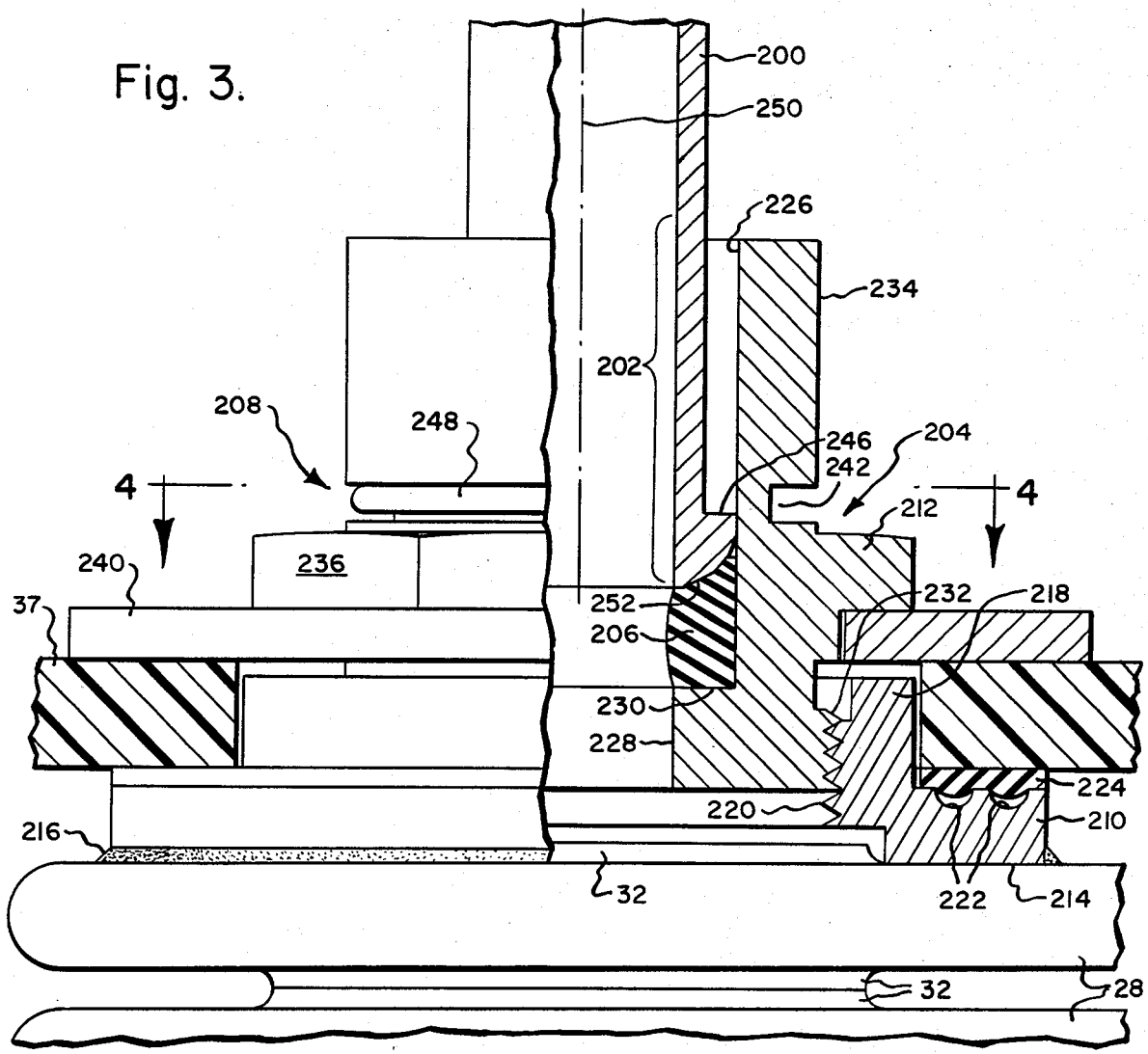
FIG. 3 is a view somewhat similar to FIG. 2 but illustrating a first embodiment of the present invention.
Figure 4:
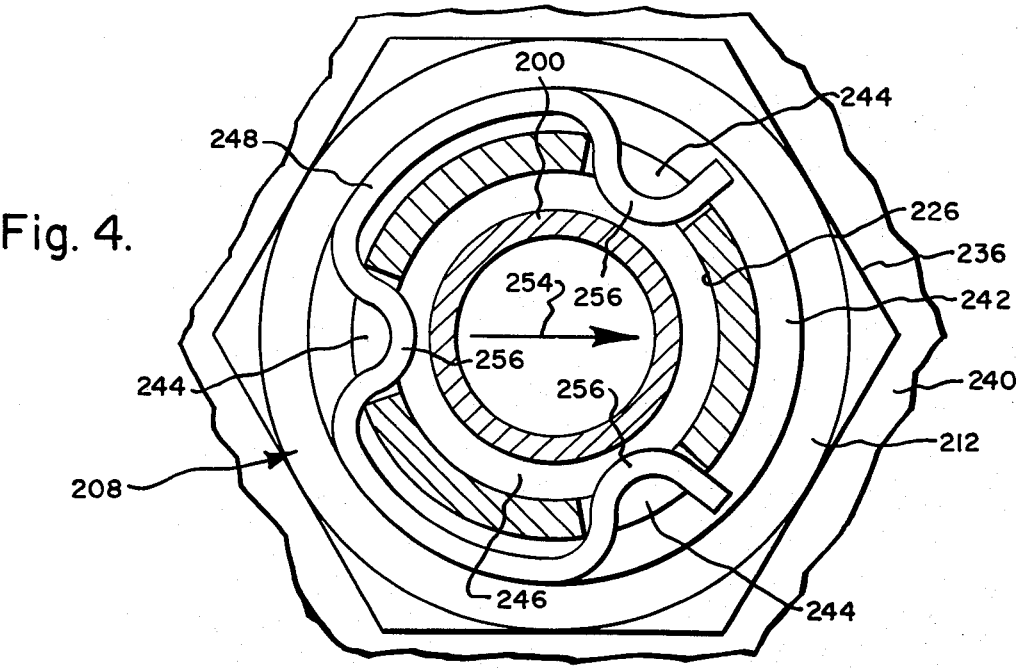
FIG. 4 is a cross sectional view taken generally along the line 4—4 in FIG. 3.

In the embodiment illustrated in FIGS. 3 and 4 a fluid coupling assembly is adapted to be associated with a header of the type illustrated in FIG. 2. Thus, the header is provided with a plastic wall 37 having an aperture 34 therein. While the header described is of plastic, it should be appreciated that the design illustrated in this figure, as well as the design illustrated in FIG. 2, can also be applied to headers having an aperture in a metallic wall, such as copper, where it is desired to form a fluid tight seal by compressing a washer to one surface of the wall of the header about the aperture. The fluid coupling of the design illustrated in FIGS. 3 and 4 will couple an oil line 200 provided with a tubular connector end portion 202 to an oil cooler 26 disposed within a radiator header having an apertured wall. The fluid coupling includes a tubular fitting, indicated generally at 204, an axially compressible tubular cylindrical elastomeric seal 206, and coupler means, indicated generally at 208. The tubular fitting 204 is formed of separable first and second portions 210,212, respectively. The first portion is provided with a generally flat first surface 214 which is adapted to be brazed, as at 216, to an exterior surface of the oil cooler 26 about the flange 32 which defines one of the ports in the oil cooler. The first portion is further provided with a neck portion 218 which is adapted to be received at least in part within the aperture 34, the neck portion having internal threads 220. The first portion further includes a radially outwardly extending portion provided with grooves 222 in that surface opposite the first surface 214, the grooves being adapted to cooperate with a compressible washer 224 to provide a seal about the aperture 34.

The second portion 212 of the tubular fitting is provided with a bore throughout its length, the bore being adapted to be disposed in concentric relationship with the locating flange 32 and the threaded aperture 220 of the first portion. The bore of the second portion includes first and second cylindrical interior surface portions 226, 228, respectively, the diameter of the first cylindrical interior surface portion being greater than the diameter of the second cylindrical interior surface portion, and the two portions being separated from each other by a radially outwardly extending step 230. Thus, it can be seen that the bore of the second portion 212 differs from that of the design shown in FIG. 2 by the provision of the step 230. The exterior surface corresponds in some respects to that of the design shown in FIG. 2. Thus, the lower end portion is provided with threads 232 which may be screwed into the threads 220. In addition, there is an upper cylindrical portion 234. Disposed between the upper cylindrical portion 234 and the lower threaded end 230 is an outwardly extending flange portion 236 which may be provided with suitable flats to facilitate the turning of the second portion into the first portion. While the flange 236 could in theory bear directly against the header wall, in order to save materials, it bears against the surface of the washer 240, the washer in turn bearing against the header wall 37. The cylindrical exterior surface portion 234 is provided with an annular recess 242, the recess in turn being provided with cutouts 244 (FIG. 4) which extend into the bore 226.

As can be seen from FIG. 3, the axially compressible tubular cylindrical elastomeric seal 206 is mounted within the bore, one end of the seal abutting the step 230. The distance between the cutouts 240 and the step 230 is greater than the normal length (that is to say the uncompressed length) of the seal 206.

The coupler means consists essentially of two differing elements. The first of these two elements is an outwardly extending surface 246 on the tubular connector end portion 202. The second of these two elements is catch means mounted on the tubular fitting, the catch means preferably being in the form of a C-shaped spring wire clip 248.

The outwardly extending surface 246 preferably extends at right angles to the axis 250 of the tubular connector end portion 202. In order to facilitate the insertion of the tubular connector end portion into the tubular fitting, a tapered leading surface or conical surface 252 is provided on the tubular end connector portion, the larger diameter of the conical surface intersecting the radially outwardly extending surface 246 at its periphery, and the smaller diameter of the conical surface being disposed at the terminal end of the end portion 202.

As previously noted, the second portion 212 of the tubular fitting 204 is provided with an annular recess 242 provided with cutouts 244. The C-shaped spring wire clip 248 is installed in this groove by moving it from a disassembled position shown in FIG. 4 in the direction of the arrow 254 to the assembled position. As can be seen, the C-shaped spring clip is provided with circumferentially spaced apart radially inwardly extending engaging means 256 and these engaging means will be disposed within the cutouts 244, with the radially inner portion of the engaging means lying within the cylindrical bore defined by the first bore surface 226.

In the design of FIGS. 3 and 4, the tubular connector end portion may be the end portion of the oil line, the conical surface 254 and the radially outwardly extending surface 246 being provided by heading the end of the oil line. Alternatively, the terminal end portion can be a separate machined part which is brazed or otherwise secured to the end of the oil line. When the parts are in their assembled position as shown in FIG. 3, it can be seen that the elastomeric seal 206 bears against the step 230 of the second portion of the tubular fitting and also bears against the conical surface of the tubular connector end portion to provide a seal between the parts, thus insuring that the flow of fluid will be through the bore of the tubular connector end portion, the central aperture within the seal 206, and also through the bores within the tubular fitting.

The tubular connector end portion can be removed from the tubular fitting by removing or spreading the C-shaped clip with a suitable tool.

A seal plug may be utilized with the design shown in FIGS. 3 and 4, the seal plug to a limited extent resembling the tubular connector end portion. Such a seal plug is shown in FIG. 4A. The seal plug, which is indicated generally at 258, consists of a generally solid cylindrical member 260 provided with a tapered leading surface 262 and an outwardly extending surface 264 adjacent the tapered leading surface. The outwardly extending surface is at an angle to the axis 266 of the cylindrical member which angle is somewhat less than 90°. The angle is preferably in the range of 75°-85°. In addition, the cylindrical member is provided with a knurled surface 268. When it is desired to connect the tubular connector end portion 202 of an oil line to the tubular fitting, it is possible to pull upon the knurled surface 268 to cause the outwardly extending angled surface 264 to bias the spring clip outwardly permitting the withdrawal of the plug 258. The plug can be made from a metallic machined part, or alternatively it can be made from a molded relatively rigid plastic part.

DETAILED DESCRIPTION OF FIGS. 5-7

In FIGS. 5-7, another embodiment of fluid coupling is illustrated. However, it should be noted that this design of fluid coupling is designed for use with a tubular fitting which can be brazed to the copper wall 70 of a header formed of copper, rather than plastic. When a fluid coupling is being assembled to an oil cooler plate and a header wall wherein the tubular fitting can be brazed to both the plate and the header wall it is desirable that the fitting be made of a single integral piece. Thus, with reference to FIG. 5, it can be seen that the tubular fitting of this embodiment, which is indicated generally at 304, is provided with integral first and second portions 310, 312, respectively, the first portion 310 is provided with a generally flat first surface 314 which is adapted to be brazed, as at 316, to an exterior surface of the oil cooler 26 about locating flange 32, the second portion 312 being brazed to the header wall 70.

The fluid coupling illustrated in FIG. 5 further includes an axially compressible tubular cylindrical elastomeric seal 306, and coupler means indicated generally at 308, the various parts being utilized to connect the tubular connector end portion 302 of an oil line 300 to the oil cooler 26. The fitting 304 is provided with first and second concentric bore surfaces 326,328 separated by a radially extending step 330. A portion of the first bore surface 326 may be provided with threads 332, the threads being utilized for the reception of a steel seal plug. While the seal plug is not shown, it resembles a flat headed screw and is utilized to prevent contamination of the oil cooler during brazing. Such a plug can be removed at the location where the brazing takes place, in which event transport seal plug may be used during shipping to the point of final assembly. Alternatively, the brazing seal plug may be removed at the point of final assembly. The first bore surface is also provided with a first annular recess 342, the annular recess 342 being of greater diameter than the normal diameter of an associated C-shaped spring wire clip 348. It should also be noted that the end of the first bore surface 326 is provided with a flared portion 338.

The coupler means 308 include a radially outwardly extending surface 346 on the tubular connector end portion 302 and a C-shaped spring wire clip 238 of substantially the same form as that illustrated in FIGS. 3 and 4. Between the end 303 of the tubular connector end portion 302 and the radially outwardly extending surface 346 is a cylindrical section 370 and a tapered leading surface in the form of a cone or conical surface 352. The larger diameter of the conical surface 352 intersects the periphery of the radially outwardly extending surface 346, and the smaller diameter intersects the cylindrical section 370 away from the end 303. It should be noted that the external diameter of the cylindrical section 370 is almost as great as the internal diameter of the second bore surface 328.

In order to facilitate the assembly of the C-shaped spring wire clip 348 and the seal 306 within the first bore 326, a thin walled carrier housing 372 is provided, this carrier housing being best illustrated in FIGS. 6 and 7. As can be seen, the carrier is provided with a radially outwardly extending lip 374 at its upper end and a radially inwardly extending lip 376 at its lower end, and a generally cylindrical portion 378 between the two lips. Circumferentially spaced apart slots 380 are provided within the cylindrical wall 378, said slots being capable of receiving radially inwardly engaging means 356 formed on the C-shaped spring wire clip. The distance between the slots and the lowermost end of the carrier housing 372 is approximately the same distance as that distance between the lower surface of the first annular recess 342 and the step 330. As can best be seen from FIG. 6, the axial distance between the slots 380 and the upper surface of the inwardly extending lip 376 is less than the axial length of the associated seal 306.

To assemble the seal and C-shaped spring wire clip into the tubular fitting 304, it is necessary to first dispose the seal 306 in the carrier housing with one end of the seal bearing against the inwardly extending lip 376. The C-shaped spring wire clip is then installed about the carrier housing with the engaging means 356 extending into the slots 380. After the carrier housing sub-assembly, which is indicated generally at 382 and which includes the spring clip and the seal, has been assembled together, it is only necessary to push the sub-assembly into the first bore 326. This can be done manually. As the parts are being assembled, the spring clip will be initially compressed as it engages the flared portion 338, however, as the carrier assumes its fully assembled position, the clip can initially expand into the first annular recess 342.

When it is desired to assemble the tubular connector end portion 302 into the tubular fitting 304, the tubular connector end portion will simply be inserted into the tubular fitting and the sub-assembly 382 which includes the seal and spring wire clip. As the tubular connector end portion approaches its final assembled position, the conical surface 352 will bear against the inwardly extending engaging means 356 of the C-shaped spring wire clip 348, causing the spring clip to expand into the first annular recess 342 until the conical surface passes by the spring wire clip, at which point the spring wire clip can then assume its normal position illustrated in FIG. 5 to thereby hold the parts in their final assembled position. When the parts are in this position, it can be seen that the seal 306 will bear against the step 330 and the conical surface 352 to form an effective seal.

In FIGS. 8 and 9 a species of the modification of FIGS. 5–7 is illustrated. This species resembles the modification of FIGS. 5–7 in all respects except that a second annular recess 384 is provided. This recess is disposed immediately above the first annular recess 342. The diameter of the second recess 384 is essentially the same as the unstressed diamter of the C-shaped spring wire clip 348.

After the sub-assembly 382 has been fully inserted into the tubular fitting 304, the parts will be in the position shown in FIG. 8. To assemble the tubular connector end portion into the tubular fitting, again the tubular connector end portion is assembled in the same manner as it is in the modification of FIGS. 5, 6 and 7. However, due to the resilient nature of the seal 306, it will tend to bias the tubular connector end portion upwardly until the spring wire clip 348 is disposed within the second annular recess 384. The clip 348 will therefore stabilize the upper end of the tube at the clip's internal diameter, which is defined by the inner periphery of the engaging means 356, are substantially the same diameter as the external portion of the tubular connector end portion adjacent the radially outwardly extending surface 346. Also, the cylindrical section 370 will be stabilized by the second bore surface 328 therefore providing a relatively stable assembly which will prevent undue wear as the parts are vibrated during use of an automobile. It can also be seen that when the parts of this species are in their assembled position, the seal 306 will provide a sealing surface between the conical surface 352 and the step 330.

While various embodiments in which the principles of the present invention have been incorporated are shown and described above, it is to be understood that this invention is not to be limited to the particular details shown and described above, but that, in fact, widely differing means may be employed in the broader aspects of this invention.

We claim:
1. A fluid coupling assembly for connecting an oil cooler disposed within a header of a radiator to the tubular connector end portion of an oil line, the header having at least one aperture in a wall thereof which receives a portion of said fluid coupling assembly, the oil cooler having a port aligned with said aperture, and said tubular connector end portion having a terminal end; wherein the improvement comprises a tubular fitting having spaced apart first and second portions and a bore extending through said portions, the first portion being brazed to said oil cooler in fluid-tight relationship about said port, and the second portion extending through said aperture and being secured to said header wall in fluid-tight relationship about said aperture, the tubular connector end portion being telescoped within said bore to an assembled position;

a tubular cylindrical elastomeric seal mounted within the bore, said seal being axially compressed when the tubular connector end portion and the tubular fitting are in their assembled position to provide a fluid-tight seal between said oil line tubular connector end portion and said oil cooler; and coupler means holding the tubular fitting and the tubular connector end portion in their assembled position, said coupler means including an outwardly extending surface on the tubular connector end portion, and said coupler means further including catch means on the tubular fitting, said catch means being a resilient clip having circumferentially spaced apart radially inwardly extending engaging means which can be moved radially outwardly against spring bias as the tubular fitting and the tubular connector end portion are telescoped together into their assembled position, the radially inwardly extending engaging means of the resilient clip being biased into locking engagement with said outwardly extending surface when the tubular fitting and the tubular connector end portion are in their assembled position whereby the parts are held together in their assembled position.

2. The fluid coupling assembly as set forth in claim 1 wherein said outwardly extending surface extends at generally right angles to the axis of the tubular connector end portion.

3. The fluid coupling assembly as set forth in claim 2 wherein the coupler means further includes a conical surface mounted on the tubular connector end portion and having its larger diameter at the periphery of the outwardly extending surface, and its smaller diameter disposed more closely to the terminal end.

4. The fluid coupling assembly as set forth in claim 3 wherein the small diameter of the conical surface is disposed at the terminal end.

5. The fluid coupling assembly as set forth in claim 3 wherein the small diameter of the conical surface is spaced away from the terminal end, the tubular connector end portion including a cylindrical section between the terminal end and the conical surface, the parts being so arranged and constructed that the conical surface bears against the tubular cylindrical seal when the parts have been telescoped together into their assembled position, the seal also bearing against the cylindrical section of the tubular connector end portion and further bearing against the surface of the bore.

6. The fluid coupling assembly as set forth in claim 5 wherein said bore is provided with a step in its surface, said seal bearing against said step.

7. The fluid coupling assembly as set forth in claim 5 wherein said cylindrical section is of approximately the same diameter as a portion of said bore, said cylindrical section bearing against said portion of the bore when the parts are in their assembled position to stabilize the tubular connector end portion.

8. The fluid coupling assembly as set forth in claim 1 wherein the first and second portions of the tubular fitting are integral with each other.

9. The fluid coupling assembly as set forth in claim 1 wherein the first and second portions of the tubular fitting are assembled to each other by screwing the second portion into the first portion.

10. The fluid coupling assembly as set forth in claim 9 wherein the second portion has a cylindrical exterior surface portion, said surface portion being a plurality of spaced apart cutouts which extend from the recess to the bore of the tubular portion, and wherein the resilient clip is a generally C-shaped spring wire clip which is received within the annular recess, the spaced apart radially inwardly extending engaging means being disposed in part within said cutouts and extending into the bore of said second portion.

11. The fluid coupling assembly as set forth in claim 10 wherein the bore of the second portion includes first and second cylindrical interior surface portions separated by a radially extending step, the first cylindrical interior surface portion being of greater diameter than the second cylindrical interior surface portion, the axially compressible tubular cylindrical seal being disposed within the first cylindrical interior surface portion adjacent the radially extending step, the cutouts being spaced away from the radially extending step a distance greater than the axial length of the seal.

12. The fluid coupling assembly as set forth in claim 1 wherein the bore of the first portion is threaded and the bore of the second portion is formed of first and second cylindrical interior surface portions separated by a radially extending step, said axially compressible tubular cylindrical seal being disposed within the first cylindrical interior surface portion with one end adjacent the radially extending step, said second portion of the tubular fitting further being provided with a cylindrical exterior surface portion and an externally threaded portion which is threaded into the threaded bore of the first portion, said cylindrical exterior surface portion being provided with an annular recess, said recess further being provided with circumferentially spaced apart cutouts which extend into the first cylindrical interior surface, the cutouts being spaced away from the radially extending step a distance greater than the axial length of the seal, and wherein the resilient clip being a C-shaped spring wire clip which is disposed within the annular recess and having at least a portion of the spaced apart radially inwardly extending engaging means disposed within the cutouts.

13. The fluid coupling assembly as set forth in claim 1 wherein the bore includes concentric first and second cylindrical interior surfaces, the first cylindrical interior surface further being provided with an annular recess, and wherein the resilient clip is a C-shaped spring wire clip which is received within the annular recess when the parts are assembled.

14. The fluid coupling assembly as set forth in claim 13 further characterized by the provision of a thin walled carrier housing, said carrier housing being provided with circumferentially spaced apart slots which receive the circumferentially spaced apart radially inwardly extending engaging means of the spring wire clip, said carrier housing being adapted to be disposed within the bore with the slots in alignment with said annular recess.

15. The fluid coupling assembly as set forth in claim 14 wherein the generally cylindrical carrier housing is further provided with an inwardly extending lip at one end, said axially compressible tubular cylindrical seal being disposed within said housing between said lip and the circumferentially spaced apart slots.

16. The fluid coupling assembly as set forth in claim 13 wherein the first and second portions of the tubular fitting are integral with each other.

17. The fluid coupling assembly as set forth in claim 13 wherein the first cylindrical interior surface is further provided with a second annular recess immediately adjacent the first annular recess, the diameter of the second recess being substantially the same as the diameter of the C-shaped spring wire clip, the parts being so arranged and constructed that the C-shaped spring wire clip will be confined between the tubular connector end portion and the second annular recess when the parts have been telescoped together to their assembled position to provide support for said tubular connector end portion.

18. The fluid coupling assembly as set forth in claim 17 wherein the outwardly extending surface extends radially outwardly from the outer surface of the tubular connector end portion, the coupler means further including a conical surface mounted on the tubular connector end portion with its larger diameter at the periphery of said outwardly extending surface and its smaller diameter intersecting the outer surface of the tubular connector end portion between the outwardly extending surface and the terminal end, the parts being so arranged and constructed that when the parts have been telescoped together to their assembled position, the outer surface of the tubular connector end portion between the terminal end and the conical surface bears against the second cylindrical interior surface to provide additional support for said tubular connector end portion.

* * * * *